United States Patent [19]
Fagg

[11] 3,961,233
[45] June 1, 1976

[54] D-C VOLTAGE CONTROL

[75] Inventor: George A. Fagg, Portland, Oreg.

[73] Assignee: Controltek, Inc., Portland, Oreg.

[22] Filed: Aug. 26, 1974

[21] Appl. No.: 500,595

[52] U.S. Cl. ............................. 318/361; 318/542
[51] Int. Cl.² .................. H02K 13/00; H02P 5/44; H02P 7/50
[58] Field of Search .................. 318/361, 541, 542

[56] References Cited
UNITED STATES PATENTS

| | | | |
|---|---|---|---|
| 1,526,613 | 2/1925 | Stephenson | 318/361 |
| 2,135,260 | 11/1938 | Norcross | 318/361 X |
| 3,364,409 | 1/1968 | Schuepp | 318/246 X |
| 3,422,334 | 1/1969 | Jastrzembski | 318/361 X |

*Primary Examiner*—B. Dobeck
*Attorney, Agent, or Firm*—Lee R. Schermerhorn

[57] ABSTRACT

This control supplies varying amounts of d-c voltage to a load, such as a motor, to control the speed of the motor, as for example in a battery powered vehicle. A rotating commutator-type switch supplies voltage during portions of each revolution depending upon the position of an adjustable pair of brushes relative to a stationary pair of brushes. An inductance stores energy during the voltage-on intervals and discharges this energy through the motor during the voltage-off intervals in each revolution of the commutator so as to supply a fluctuating voltage to the motor.

8 Claims, 5 Drawing Figures

D-C VOLTAGE CONTROL

BACKGROUND OF THE INVENTION

This invention relates to a d-c voltage control system and has particular reference to a speed control for a battery powered vehicle.

Present controls for this purpose are of two types, resistive and electronic switching. The resistive controls supply pure d-c but their efficiency is very poor. Electronic switching controls are more efficient but are more expensive and do not supply pure d-c to the motor, which decreases motor efficiency.

Objects of the invention are, therefore, to provide an improved d-c voltage control, to provide an improved d-c motor control, to provide a motor control which supplies pure d-c to the motor, and to provide a highly efficient d-c motor control which is relatively economical to produce.

SUMMARY OF THE INVENTION

In the present device a rotating commutator-type switch supplies voltage during variable portions of each revolution of the commutator depending upon the angular position of an adjustable pair of brushes relative to a stationary pair. In one extreme position of the adjustable brushes no voltage is supplied and in an opposite extreme position, when the adjustable brushes are in line with the stationary brushes, full voltage is supplied. In intermediate positions voltage is supplied momentarily during each revolution of the commutator. An inductance stores energy during the voltage-on intervals and discharges this energy through the motor during the voltage-off intervals.

This arrangement provides pure d-c with an efficiency of greater than 90 percent. The action of the inductance tends to average the voltage applied to the motor thereby decreasing motor heating and increasing motor efficiency.

The invention will be better understood and additional objects and advantages will become apparent from the following description of the preferred embodiment illustrated in the accompanying drawings. Various changes may be made in the arrangement of the circuit and certain features may be used without others. All such modifications within the scope of the appended claims are included in the invention.

DESCRIPTION OF THE PREFERRED EMBODIMENT

Figure 1:
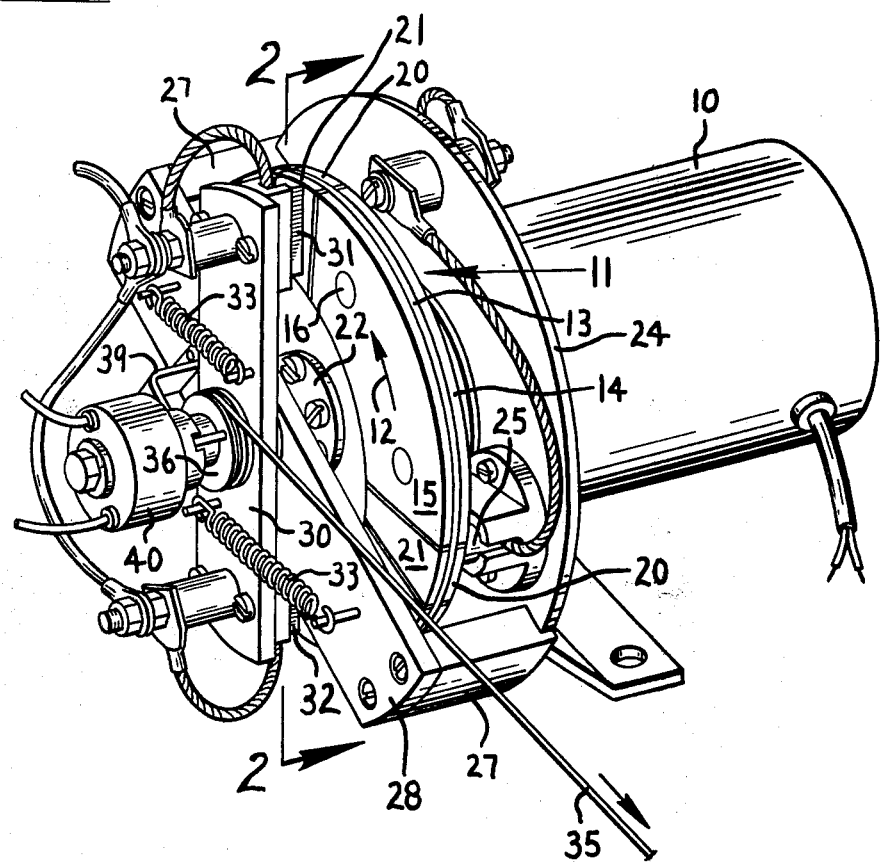
FIG. 1 is a perspective view of a rotary commutator-type switch embodying the invention.
Figure 4:
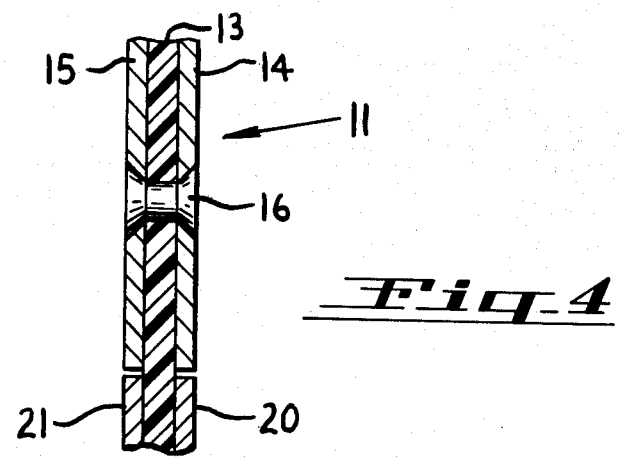
FIG. 4 is a view on the line 4—4 in FIG. 2.

In FIG. 1 a small d-c motor 10 drives a commutator 11 in the direction of arrow 12. As shown in FIG. 4, the commutator 11 comprises an insulating disc 13 having a plurality of copper segments 14 on one face and identical copper segments 15 on the opposite face in the same angular positions as the segments 14. The segments 14 and 15 are secured to disc 13 and electrically connected to each other by pairs of copper rivets 16.

In the preferred embodiment there are four segments 14 and four segments 15 with the ends of segments 14 spaced apart from each other and the ends of segments 15 similarly spaced apart. Small copper segments 20 are interposed between adjacent ends of segments 14, leaving minute air gaps so that the segments 20 are not electrically connected with segments 14.

Similarly, on the opposite side of disc 13 small copper segments 21 are interposed between adjacent ends of the segments 15 with small air gaps between the segments so that the segments 21 are not electrically connected with the segments 15. The small segments 20 and 21 are secured to disc 13 by rivets similar to rivets 16. Insulating disc 13 is mounted on a hub 22 on the shaft of motor 10.

A plate 24 on the housing of motor 10 supports a pair of stationary brushes 25 and 26 positioned 180° apart which ride on commutator segments 14 and 20. The width of brushes 25 and 26 tapers corresponding to dimensions of segments 20.

A stationary frame comprising a pair of axial members 27 and diametral member 28 is mounted on plate 24 with member 28 disposed beyond the end of the motor shaft. An adjustable brush arm 30 is pivotally mounted on member 28 co-axial with the motor shaft. Brush arm 30 carries a pair of brushes 31 and 32, identical to the brushes 25 and 26, which ride on commutator segments 15 and 21. Brush arm 30 is biased in the direction of arrow 12 by a pair of springs 33. Suitable stop means are provided to limit rotation of brush arm 30 in this direction at a position 90° from the positions of stationary brushes 25 and 26.

Brush arm 30 may be rotated 90° counter to the direction of arrow 12 by a pull cable 35 which is anchored to a cable drum 36 mounted on arm 30. Suitable stops are also provided to limit this arm movement by pull cable 35 to a position wherein the adjustable brushes 31 and 32 are precisely aligned with the stationary brushes 25 and 26.

A bracket 39 on stationary member 28 mounts a potentiometer 40, the purpose of which will presently be described. Potentiometer 40 has a rotary contact arm co-axial with and coupled to movable brush arm 30 so that the potentiometer contact arm moves with the movable brushes 31 and 32. These movements are effected through pull cable 35 by accelerator pedal 41 in a vehicle 42 in FIG. 3.

Figure 5:
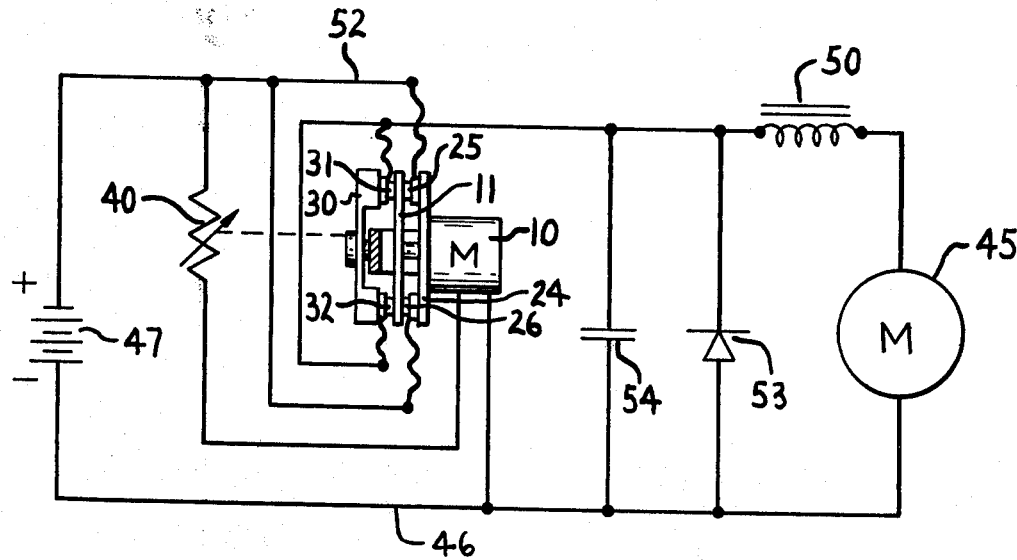
FIG. 5 is a wiring diagram of the system.

In FIG. 5 the motor to be controlled is the motor 45 one terminal of which is connected through wire 46 to battery 47. The other motor terminal is connected through inductance 50 and wire 51 with the adjustable brushes 31 and 32. Stationary brushes 25 and 26 are connected through wire 52 to battery 47. The circuit further includes a crystal rectifier diode 53 and an arc suppressing capacitance 54 to minimize brush arcing.

It will thus be apparent that when movable brushes 31 and 32 are aligned with stationary brushes 25 and 26, the brush 31 is at all times electrically connected with brush 25, and brush 32 is at all times electrically connected with brush 26 whereby motor 45 is continuously energized through inductance 50. The brushes 31 and 32 are then in a limit position of clockwise rotation in FIGS. 1 and 3 produced by full movement of accelerator pedal 41. Motor 45 drives the vehicle 42.

Figure 2:
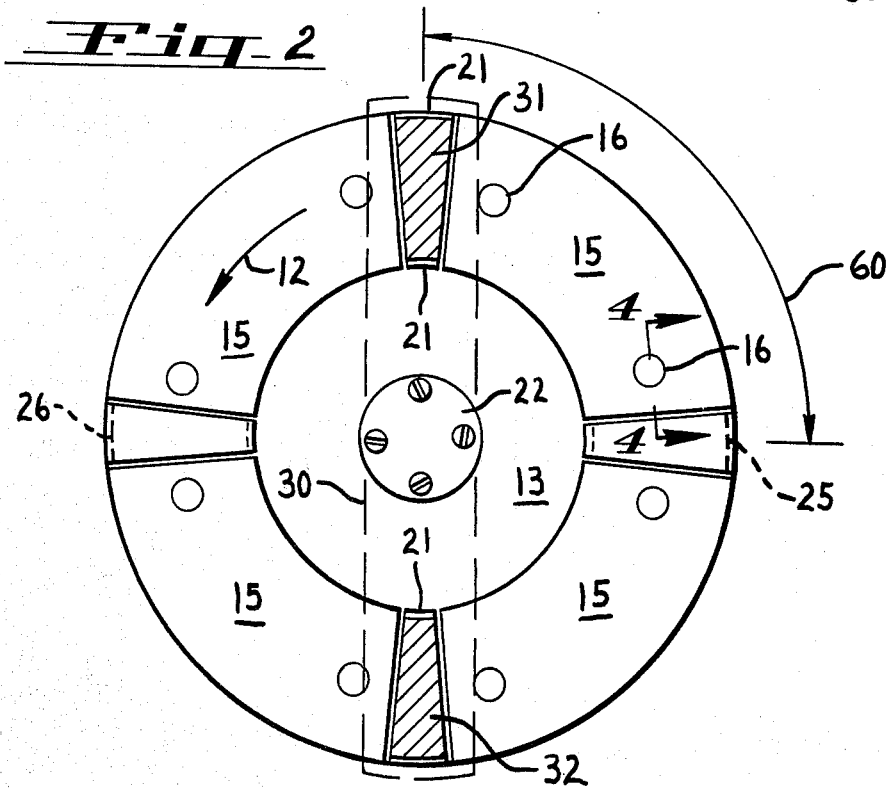
FIG. 2 is a view on the line 2—2 in FIG. 1.

When the operator's foot is removed from the accelerator pedal, springs 33 return the brushes 31 and 32 to their opposite limit position 90° from the positions of stationary brushes 25 and 26. This is the condition illustrated in FIG. 2 where there is an open circuit between the brushes 31 and 32 and the brushes 25 and 26 and the motor 45 is deenergized. In the event of failure of springs 33, commutator friction will return the brushes 31 and 32 to open circuit position, making the control fail-safe in operation.

Figure 3:
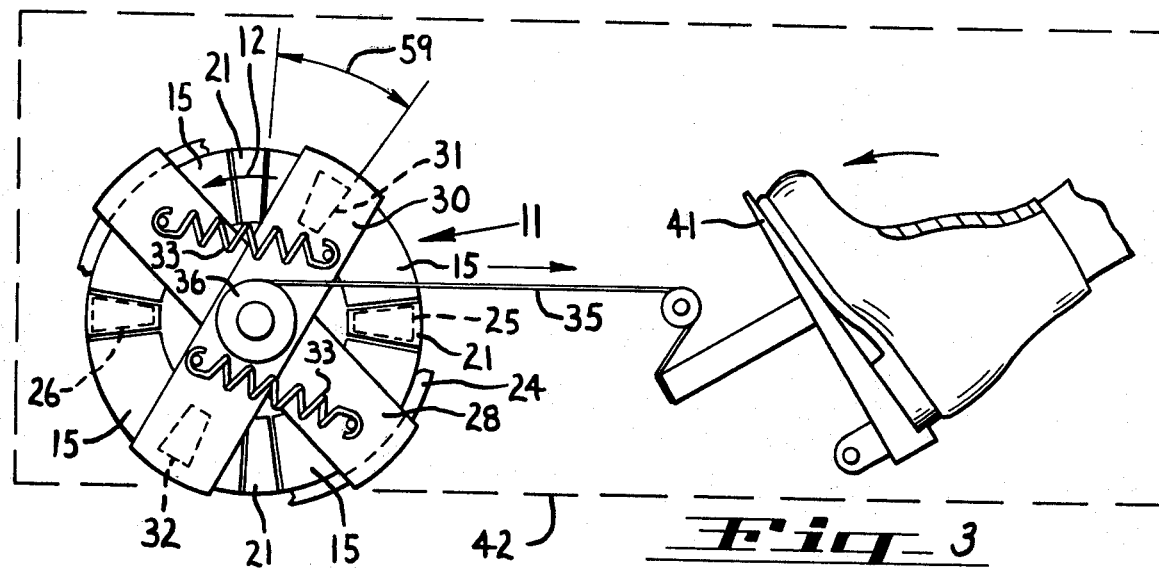
FIG. 3 is a diagrammatic view showing the speed control for a vehicle motor.

In intermediate positions of the brushes 31 and 32, as indicated by arc 59 in FIG. 3, the circuit is completed during intervals in each revolution of commutator disc 11. As the brushes 31 and 32 approach the brushes 25 and 26, as indicated by the arc 60 in FIG. 2, the intervals of energization become longer and as the brushes 31 and 32 approach a position 90° from the brushes 25 and 26, the intervals of energization become shorter, providing a stepless, gradual speed control for the motor 45. These switching functions may be produced by a cylindrical commutator as well as the disc commutator shown.

During such intervals of energization the inductance 50 stores energy and between the intervals of energization the stored energy is discharged into motor 45 through diode 53. This action of the inductance and diode tends to average the voltage applied to the motor, thereby decreasing motor heating and increasing motor efficiency.

Potentiometer 40 varies the speed of commutator 11 in accordance with the positions of brushes 31 and 32, in the range of about 700 r.p.m. to about 1100 r.p.m., causing the commutator speed to increase as brushes 31 and 32 approach brushes 25 and 26. Thus, as the inductance charges to a higher voltage during longer voltage-on intervals, it is afforded more frequent intervals for discharge into motor 45.

In some cases, however, it is found that there is an optimum commutator speed for a given motor 45 regardless of motor speed and in such cases the potentiometer 40 may be disassociated from brush arm 30 and adjusted initially to operate commutator motor 10 at the fixed optimum speed.

There may be a plurality of commutator discs 11, with fixed and movable brushes, on the shaft of motor 10 to control several motors 45 independently or in unison. In a lift truck, for example, a first commutator may control the drive motor, a second commutator may control the lift motor and a third commutator may control the mast tilt motor.

The present system is not limited to speed control for a motor but is also useful for controlling other types of d-c loads.

Having now described my invention and in what manner the same may be used, what I claim as new and desire to protect by Letters Patent is:

1. A d-c voltage control system comprising a commutator-type switching device arranged to continuously close and open an energizing circuit for a load so as to provide closed circuit and open circuit intervals in each revolution of the commutator, means for varying the duration of said closed circuit intervals in relation to said open circuit intervals, an inductance in series with said load in said energizing circuit, and a rectifier in parallel with said load and inductance; said switching device comprising a commutator, a pair of stationary brushes spaced 180° apart connected to a supply wire, and a pair of movable brushes spaced 180° apart connected to said energizing circuit, said means for varying the duration of said closed circuit intervals shifting said movable brushes; said commutator comprising an insulating disc having conductive segments in corresponding positions on opposite faces of said disc, said corresponding segments being electrically connected to each other, said stationary brushes being disposed on one face of said disc, and said movable brushes being disposed on the opposite face of said disc.

2. A system as defined in claim 1 including a commutator motor driving said commutator, speed control means for said commutator motor, and actuating means for said speed control means coupled to said movable brushes.

3. A system as defined in claim 2, said load comprising a motor, and speed control means for said motor arranged to shift said movable brushes.

4. A d-c voltage control system in an energizing circuit for a load comprising a commutator, a motor driving said commutator, stationary brush means engaging said commutator, movable brush means engaging said commutator, means for rotating said movable brush means through a predetermined angle of adjustment to shift said movable brush means in a range of movement between a position closing a circuit through said commutator to said stationary brush means and a position opening said circuit, said movable brush means in intermediate positions providing closed circuit intervals and open circuit intervals in each revolution of the commutator, said closed circuit intervals increasing in duration as said movable brush means approaches said closed circuit position and said open circuit intervals gradually increasing in duration as said movable brush means approaches said open circuit position, said commutator, motor and brush means being mechanically independent of said load, an inductance apart from said load in series with said load in said energizing circuit, and a rectifier in parallel with said load and inductance, said inductance storing energy during said closed circuit intervals and discharging said energy through said rectifier into said load during said open circuit intervals to average the voltage applied to said load in said intermediate positions of said movable brush means.

5. A system as defined in claim 4, said stationary brush means comprising a pair of brushes spaced 180° apart and said movable brush means comprising a pair of brushes mounted 180° apart on a rotatable brush arm.

6. A system as defined in claim 4 including means for varying the speed of said commutator motor.

7. A system as defined in claim 6, said means for varying the speed of said commutator motor being coupled to said movable brush means.

8. A system as defined in claim 4, said load comprising a motor, and speed control means for said motor arranged to operate said means for rotating said movable brush means.

* * * * *